(12) United States Patent
Liu et al.

(10) Patent No.: US 11,813,611 B2
(45) Date of Patent: Nov. 14, 2023

(54) REFRIGERATOR

(71) Applicants: QINGDAO HAIER REFRIGERATOR CO., LTD., Shandong (CN); HAIER SMART HOME CO., LTD., Shandong (CN)

(72) Inventors: Haoquan Liu, Qingdao (CN); Bin Fei, Qingdao (CN); Bintang Zhao, Qingdao (CN); Jing Wang, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 18/246,465

(22) PCT Filed: Sep. 9, 2021

(86) PCT No.: PCT/CN2021/117433
§ 371 (c)(1),
(2) Date: Mar. 23, 2023

(87) PCT Pub. No.: WO2022/062909
PCT Pub. Date: Mar. 31, 2022

(65) Prior Publication Data
US 2023/0271183 A1 Aug. 31, 2023

(30) Foreign Application Priority Data

Sep. 27, 2020 (CN) .......................... 202022146845.5

(51) Int. Cl.
*B01L 3/00* (2006.01)
*F25D 23/12* (2006.01)
*G01N 21/78* (2006.01)

(52) U.S. Cl.
CPC ........ *B01L 3/502715* (2013.01); *F25D 23/12* (2013.01); *G01N 21/78* (2013.01);
(Continued)

(58) Field of Classification Search
CPC ........... B01L 3/502715; B01L 2200/04; B01L 2200/0689; B01L 2200/16; B01L 2300/0819; F25D 23/12; G01N 21/78
See application file for complete search history.

(56) References Cited

U.S. PATENT DOCUMENTS

2009/0009042 A1  1/2009  Kim et al.

FOREIGN PATENT DOCUMENTS

CN  204165319 U  2/2015
CN  108801929 A  * 11/2018
(Continued)

OTHER PUBLICATIONS

International Search Report and Written Opinion for PCT/CN2021/117433 (ISA/CN) dated Dec. 9, 2021 w/English translation (9 pages)

(Continued)

*Primary Examiner* — Dennis White
(74) *Attorney, Agent, or Firm* — ALSTON & BIRD LLP

(57) ABSTRACT

A refrigerator, comprising: a refrigerator body internally defining a storage space for storing articles, a door connected to the refrigerator body and used for opening and/or closing the storage space, and a microfluidic detection system which is provided on the door and comprises: a microfluidic biochip having a sample inlet, a communication port, and a detection pool formed in the microfluidic biochip, the sample inlet, the detection pool, and the communication port being connected in sequence by means of a microfluidic channel to allow a sample fluid in contact with the sample inlet to enter the microfluidic channel and flow (Continued)

into the detection pool by means of the microfluidic channel; and a detection mechanism used for detecting the detection pool after the sample fluid in the detection pool reacts with a detection reagent in the detection pool to obtain a preset detection parameter of the sample fluid.

11 Claims, 7 Drawing Sheets

(52) U.S. Cl.
CPC ... *B01L 2200/04* (2013.01); *B01L 2200/0689* (2013.01); *B01L 2200/16* (2013.01); *B01L 2300/0819* (2013.01)

(56) References Cited

FOREIGN PATENT DOCUMENTS

| | | |
|---|---|---|
| CN | 210037828 U | 2/2020 |
| CN | 214039110 U | 8/2021 |
| KR | 20120011458 A | 2/2012 |

OTHER PUBLICATIONS

Written Opinion of the International searching Authority for PCT/CN2021/117433 (ISA/CN) dated Dec. 9, 2021 (4 pages).

\* cited by examiner

REFRIGERATOR

CROSS-REFERENCE TO RELATED APPLICATIONS

The present application is a national phase entry of International Application No. PCT/CN2021/117433, filed Sep. 9, 2021, which claims priority to Chinese Application No. 202022146845.5, filed Sep. 27, 2020, which are each incorporated herein by reference in its entirety.

FIELD OF THE INVENTION

The present invention relates to refrigerating and freezing technologies, and particularly to a refrigerator.

BACKGROUND OF THE INVENTION

With the improvement of the living standard of people, pesticide residues, viruses, nutritional elements or other aspects of some edible food materials are usually required to be detected in daily life, so as to qualitatively or quantitatively obtain the conditions of the food materials. For example, due to the pesticide abuse problem, fruits, vegetables and agricultural and sideline products purchased daily by people may have the problem of excessive pesticide residue content, and if the problem of excessive pesticide residue content of the foods cannot be found in time, great harm may be caused after people ingest the foods. For another example, currently advocated breast feeding is best feeding for infants only when breast milk has normal nutritional value, but in cases of diseases, medicine taking, surgery or other cases of the mother, the milk secreted by the mother may have reduced content of nutritional elements and even produce viruses, thereby affecting the growth and health of the infants.

However, an existing detection system is generally independent, occupies a space, and is inconvenient to store, and a user may forget to use a detection device after the detection device is stored, or does not take out the detection device for use due to bother. Therefore, in the prior art, the detection system for detecting pesticide residues is integrated in a refrigerating chamber of a refrigerator or a pesticide residue detection chamber is additionally provided in a storage space of the refrigerator, such that a large part of the storage space is occupied in either solution, and the use experience of the user is influenced.

BRIEF DESCRIPTION OF THE INVENTION

An object of the present invention is to overcome at least one of the drawbacks of the prior art, and to provide a refrigerator with a microfluidic detection system which does not occupy an original storage space.

A further object of the present invention is to keep good heat insulation performance of the refrigerator and improve the convenience of operation of the microfluidic detection system by a user.

Another object of the present invention is to facilitate assembly and disassembly of the microfluidic detection system.

In order to achieve the above objects, the present invention provides a refrigerator, including:
a refrigerator body internally defining a storage space for storing articles;
a door connected to the refrigerator body and used for opening and/or closing the storage space; and
a microfluidic detection system which is provided on the door and comprises:
a microfluidic biochip having a sample inlet, a communication port, and a detection pool formed in the microfluidic biochip, the sample inlet, the detection pool, and the communication port being communicated in sequence by means of a microfluidic channel to allow a sample fluid in contact with the sample inlet to enter the microfluidic channel and flow into the detection pool by means of the microfluidic channel; and
a detection mechanism used for detecting the detection pool to obtain a preset detection parameter of the sample fluid.

Optionally, the microfluidic detection system further includes:
a sample stage for placing a sample cup, the sample cup being used for containing the sample fluid; and
a housing provided with an operation stage opened towards the front side thereof, the sample stage being at least partially located in the operation stage.

Optionally, a hollowed window is formed in the front side of the door, and the operation stage is exposed on the front side of the door through the hollowed window.

Optionally, the door includes a panel for forming a front portion of the door, a door liner for forming a rear portion of the door and a foamed heat insulation layer provided between the panel and the door liner, and the hollowed window is formed on the panel; and
a pre-embedded box is pre-embedded between the panel and the door liner before the foamed heat insulation layer is formed, and the microfluidic detection system is provided in the pre-embedded box.

Optionally, the pre-embedded box is attached to a rear surface of the panel, and the front side of the pre-embedded box is open and directly faces the hollowed window to allow the microfluidic detection system to be mounted into the pre-embedded box from front to back through the hollowed window.

Optionally, the housing is provided with a first structural connecting piece for being connected with the pre-embedded box and a first electrical connecting piece for forming an electrical connection between the microfluidic detection system and an electrical control device of the refrigerator, so as to allow the microfluidic detection system to be mounted to the door as a whole;
the pre-embedded box is provided with a second structural connecting piece matched and connected with the first structural connecting piece and a second electrical connecting piece electrically connected with the first electrical connecting piece, and the second electrical connecting piece is electrically connected with the electrical control device.

Optionally, the microfluidic biochip is provided above the sample stage, and the sample inlet is located at the bottom of the microfluidic biochip; and
the sample stage is configured to controllably or operably move up and down, such that the sample stage is switched between a detection position allowing the sample fluid in the sample cup placed on the sample stage to be in contact with the sample inlet and an initial position at a preset distance below the detection position.

Optionally, the microfluidic biochip is removably located above the sample stage, and the sample inlet is located at the bottom of the microfluidic biochip; and
the microfluidic detection system further includes:

a chip mounting mechanism provided in the housing and used for supporting the microfluidic biochip; and a chip withdrawing mechanism used for operably releasing the support effect of the chip mounting mechanism on the microfluidic biochip, so as to release the microfluidic biochip to enable the microfluidic biochip to fall onto the sample stage under the action of the gravity thereof.

Optionally, the microfluidic detection system further includes:

a buffer fluid bottle provided in the housing and used for containing a buffer fluid; and a buffer fluid driving device provided in the housing and communicated with the buffer fluid bottle to controllably drive the buffer fluid in the buffer fluid bottle into the sample cup placed on the sample stage, such that the buffer fluid is mixed with a sample in the sample cup to generate the sample fluid.

Optionally, the sample stage includes:

a support stage used for supporting the sample cup; and an oscillator provided on the support stage and used for oscillating the sample cup after the sample cup is placed on the support stage, such that the buffer fluid and the sample in the sample cup are fully mixed.

Optionally, the microfluidic detection system further includes:

a sample fluid driving device in sealed communication with the communication port to impel the sample fluid in contact with the sample inlet to flow into the microfluidic channel and flow to the detection pool by means of the microfluidic channel.

The refrigerator according to the present invention is provided with the microfluidic detection system, such that the microfluidic detection system is not required to be independently stored, and does not occupy an indoor space. In addition, the refrigerator is a common household appliance, such that a user can conveniently and randomly utilize the microfluidic detection system on the refrigerator to meet requirements of detection, such as pesticide residue detection, nutritional element detection, breast milk detection, or the like, with convenient and rapid use. Meanwhile, the microfluidic detection system is provided on the door, such that the operation is convenient, the original storage space in the refrigerator body cannot be occupied, and the storage capacity of the refrigerator cannot be influenced.

Further, the operation stage opened forwards is formed on the housing of the microfluidic detection system, the sample stage is located in the operation stage, the hollowed window is provided on the front side of the door, and the operation stage is exposed on the front side of the door through the hollowed window of the door. That is, the operation stage is exposed, such that the user can conveniently carry out a series of operations in the operation stage without opening the door, such as taking and placing of the sample cup, replacement of the microfluidic biochip, or the like; on the one hand, the problem of serious cold leakage caused by an increase of the opening frequency of the door due to the arrangement of the microfluidic detection system can be avoided to guarantee the refrigerator to have a good heat insulation performance; on the other hand, the user is not required to open the door when performing the detection operation, thus improving the convenience of operation of the microfluidic detection system by the user.

Further, the door is provided with the pre-embedded box, and the microfluidic detection system has the housing; the microfluidic detection system is mounted on the door as a whole by arranging the corresponding structural connecting pieces and electrical connecting pieces on the pre-embedded box and the housing, such that the whole microfluidic detection system is connected with the refrigerator in terms of both structure and circuit. Thus, an assembly process of the microfluidic detection system is simplified, and the disassembly or maintenance of the microfluidic detection system is facilitated.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Figure 1:
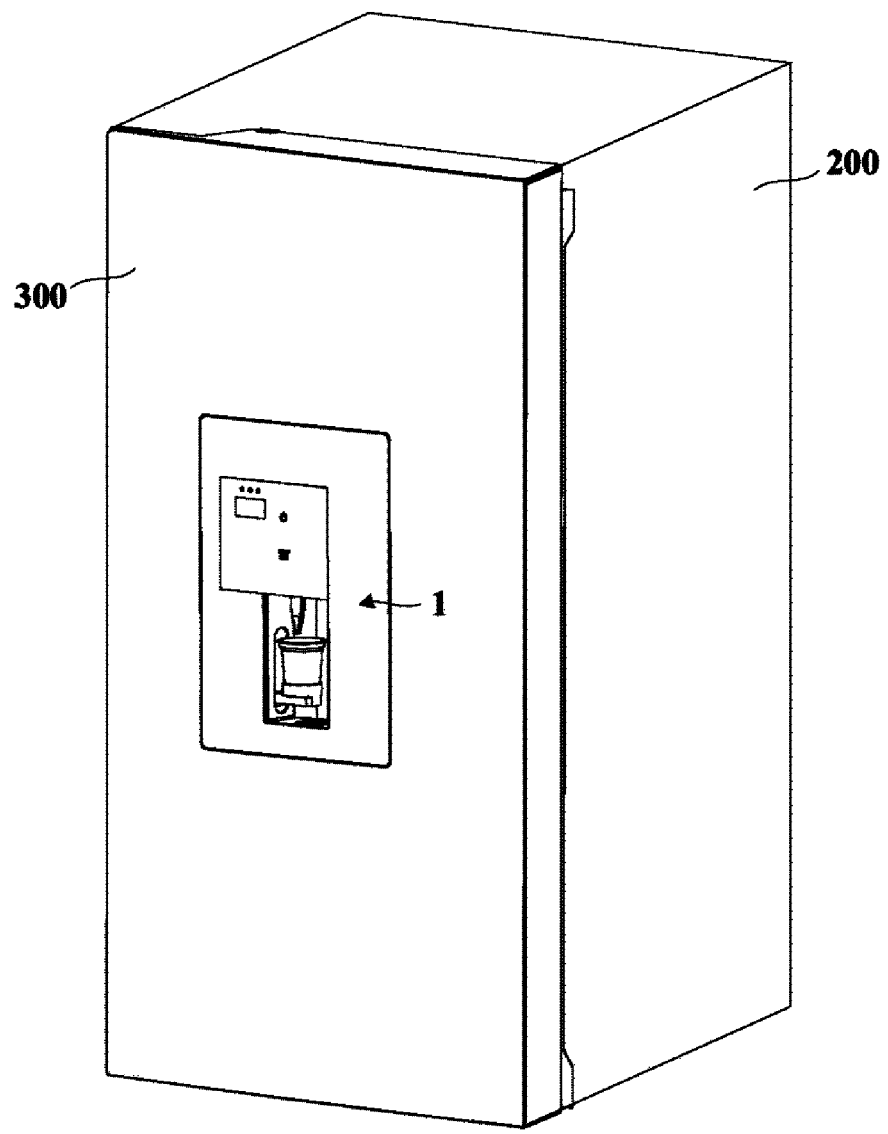
FIG. 1 is a schematic structural diagram of a refrigerator according to an embodiment of the present invention.

The present invention provides a refrigerator. FIG. 1 is a schematic structural diagram of the refrigerator according to an embodiment of the present invention. Referring to FIG. 1, the refrigerator 100 according to the present invention includes a refrigerator body 200 and a door 300. The refrigerator body 200 internally defines a storage space for storing articles, and the door 300 is connected to the refrigerator body 200 and used for opening and/or closing the storage space.

In particular, the refrigerator 100 further includes a microfluidic detection system 1, and the microfluidic detection system 1 is provided on the door 300. The microfluidic detection system 1 is used for qualitatively or quantitatively detecting a preset detection parameter of a sample fluid; the preset detection parameter may be, for example, a pesticide residue parameter for indicating whether a pesticide residue content exceeds the standard and/or a specific value of the pesticide residue content, a nutrient parameter for indicating whether a nutritional element meets the standard and/or a specific content of the nutritional element, a specific substance parameter for indicating whether a specific harmful substance (for example, a specific virus) exceeds the standard and/or a specific content thereof, or the like.

Figure 2:
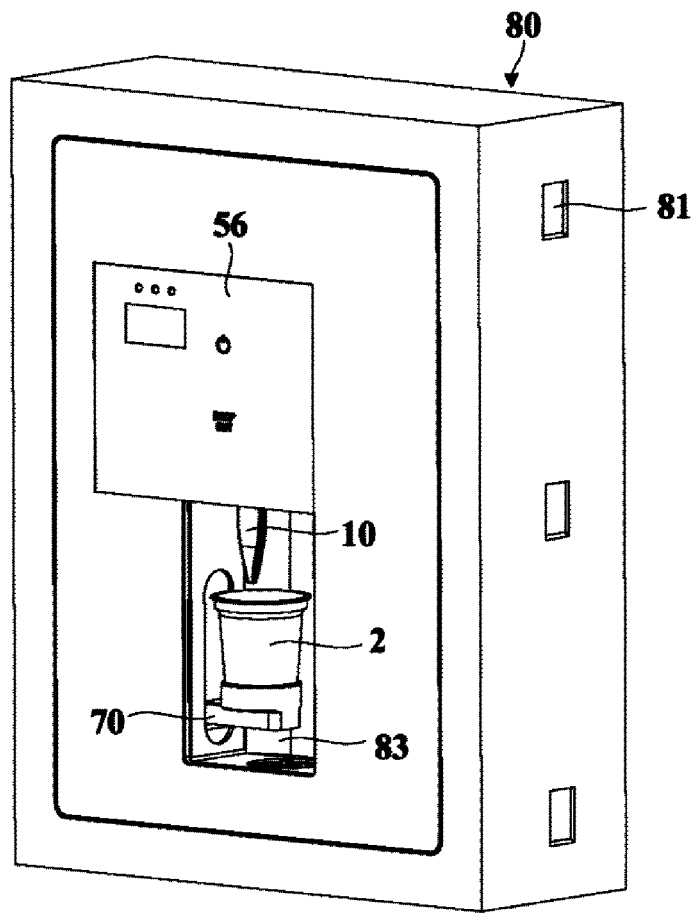
FIG. 2 is a schematic structural diagram of a microfluidic detection system in an embodiment of the present invention.
Figure 3:
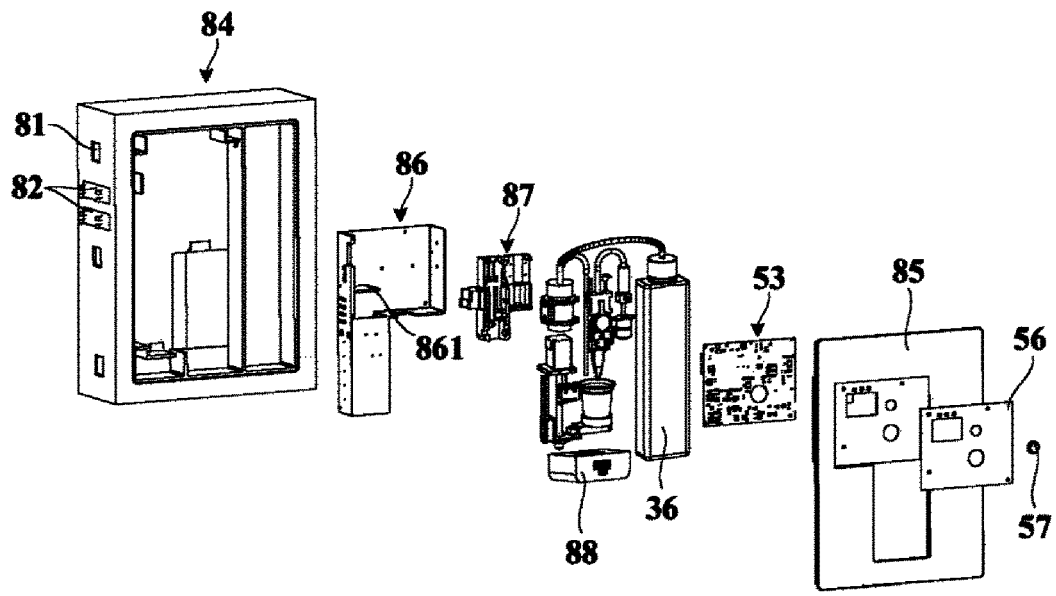
FIG. 3 is a schematic exploded structural diagram of a microfluidic detection system in an embodiment of the present invention.
Figure 4:
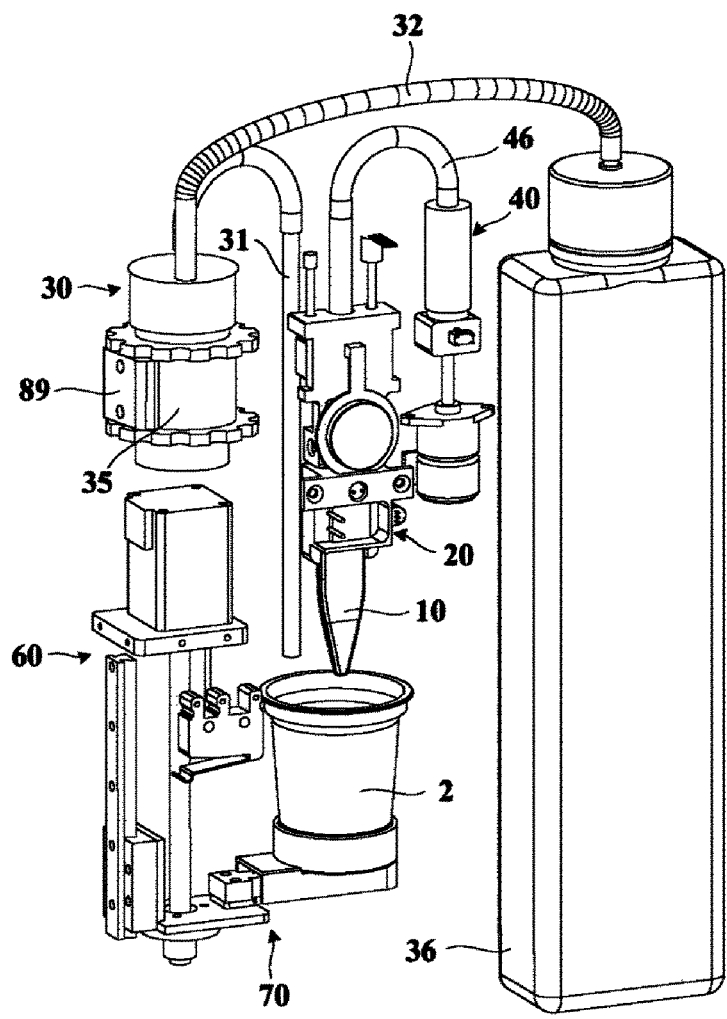
FIG. 4 is a schematic structural diagram of an internal structure of a microfluidic detection system in an embodiment of the present invention.
Figure 5:
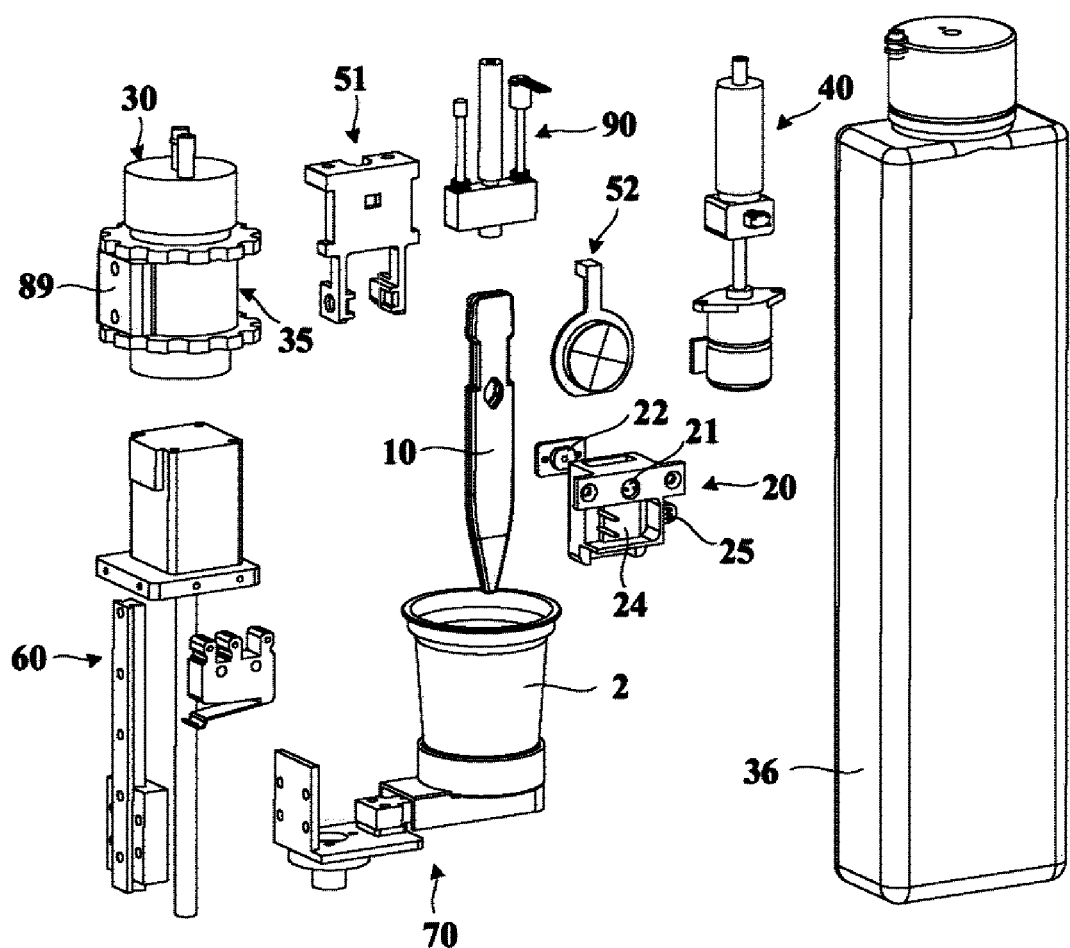
FIG. 5 is a schematic exploded structural diagram of an internal structure of a microfluidic detection system in an embodiment of the present invention.

FIG. 2 is a schematic structural diagram of the microfluidic detection system in an embodiment of the present invention, FIG. 3 is a schematic exploded structural diagram of the microfluidic detection system in an embodiment of the present invention, FIG. 4 is a schematic structural diagram of an internal structure of the microfluidic detection system in an embodiment of the present invention, and FIG. 5 is a schematic exploded structural diagram of the internal structure of the microfluidic detection system in an embodiment of the present invention. For ease of understanding, a sample cup 2 is also shown in FIGS. 1 to 5.

Referring to FIGS. 2 to 5, the microfluidic detection system 1 may include a microfluidic biochip 10 and a detection mechanism 20. It may be appreciated by those skilled in the art that specific selection of the microfluidic biochip 10 and the detection mechanism 20 used in the microfluidic detection system may vary when the preset detection parameter detected by the microfluidic detection system vary. For example, when the microfluidic detection system is used for pesticide residue detection, the microfluidic biochip 10 thereof can be a microfluidic pesticide residue detection chip capable of providing detection conditions for a pesticide residue fluid, and the detection mechanism 20 thereof can be a pesticide residue detection mechanism capable of detecting a pesticide residue parameter of the pesticide residue fluid.

Figure 6:
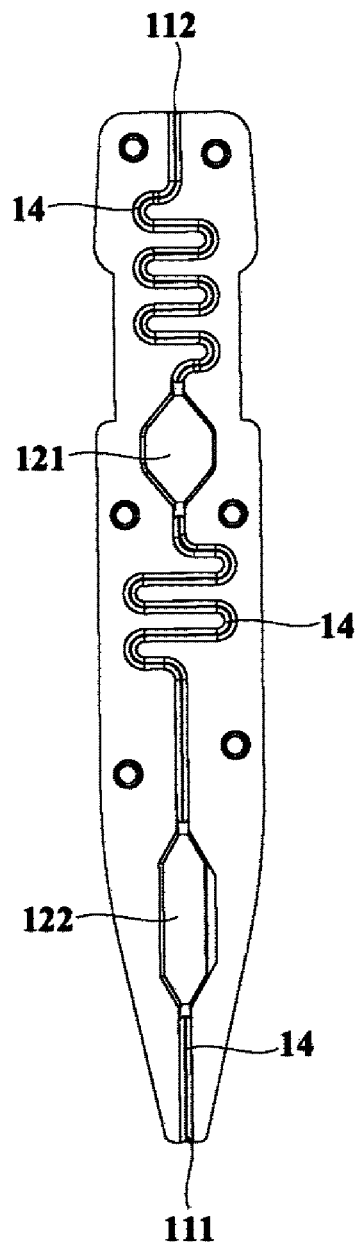
FIG. 6 is a schematic sectional diagram of a microfluidic biochip in an embodiment of the present invention.

FIG. 6 is a schematic sectional diagram of the microfluidic biochip in an embodiment of the present invention; the microfluidic biochip 10 has a sample inlet 111 formed in an end portion thereof, a communication port 112, and a detection pool 121 formed in the microfluidic biochip, the sample inlet 111, the detection pool 121, and the communication port 112 being communicated in sequence by means of a microfluidic channel 14 to allow the sample fluid in contact with the sample inlet 111 to enter the microfluidic channel 14 and flow into the detection pool 121 by means of the microfluidic channel 14. The microfluidic channel 14 in the present invention means a micro flow channel or a capillary flow channel having a flow area within a preset size range, so as to have a suitable capability of holding a fluid therein. The sample inlet 111 and the communication port 112 may be formed at the end portion of the microfluidic biochip 10. Further, the sample inlet 111 and the communication port 112 are preferably formed at different end portions of the microfluidic biochip 10.

The detection mechanism 20 is used for detecting the detection pool 121, so as to obtain the preset detection parameter of the sample fluid. Specifically, the detection pool 121 may be provided therein with a detection reagent in advance, or the detection reagent may be manually or automatically added to the detection pool 121, such that the detection mechanism 20 detects the detection pool 121 after the sample fluid in the detection pool 121 reacts with the detection reagent therein.

The refrigerator 100 according to the present invention is provided with the microfluidic detection system 1, such that the microfluidic detection system 1 is not required to be independently stored, and does not occupy an indoor space. In addition, the refrigerator 100 is a common household appliance, such that a user can conveniently and randomly utilize the microfluidic detection system 1 on the refrigerator 100 to meet requirements of detection, such as pesticide residue detection, nutritional element detection, breast milk detection, or the like, with convenient and rapid use. Meanwhile, the microfluidic detection system 1 is provided on the door 300, such that the operation is convenient, the original storage space in the refrigerator body 200 cannot be occupied, and the storage capacity of the refrigerator 100 cannot be influenced.

In a specific embodiment, when the detection mechanism 20 is a pesticide residue detection mechanism for detecting the pesticide residue parameter of the pesticide residue fluid, an enzyme inhibition rate method can be used to rapidly and qualitatively detect whether pesticide residues in the sample fluid exceed the standard. At this point, the microfluidic biochip 10 further includes a reaction pool 122 formed therein, and the reaction pool 122 is located on a main channel formed by sequentially communicating the sample inlet 111, the detection pool 121, and the communication port 112, and is communicated between the sample inlet 111 and the detection pool 121, such that the sample fluid firstly reacts with a reaction reagent in the reaction pool 122 and then flows into the detection pool 121. The reaction pool 122 is communicated with the sample inlet 111 through the microfluidic channel 14, and the reaction pool 122 is communicated with the detection pool 121 through the microfluidic channel 14. The reaction reagent and the detection reagent for pesticide residue detection may be an enzyme reagent and a color developing agent respectively. The reaction pool 122 is configured to allow the sample fluid to react with the enzyme reagent therein, and the sample fluid after the reaction with the enzyme reagent flows into the detection pool 121 to react with the color developing agent in the detection pool 121. The detection mechanism 20 may be selected as a photoelectric detection mechanism and may include a light source 21 and a photosensitive element 22 arranged on two opposite sides of the microfluidic biochip 10 respectively and directly facing the detection pool 121, light emitted from the light source 21 is irradiated to the detection pool 121, and light transmitted through the detection pool 121 is introduced into the photosensitive element 22, which facilitates judgment of the change in an absorbance in the detection pool 121 using a light intensity signal received by the photosensitive element 22, and then facilitates calculation of a pesticide residue inhibition rate. Further, the detection mechanism 20 further includes a heating sheet 24 for supplying heat to the detection pool 121 and a temperature controller 25 for controlling the heating power of the heating sheet 24 to be constant, such that the sample fluid and the detection reagent in the detection pool 121 can react sufficiently and rapidly.

In some embodiments, the microfluidic detection system 1 further includes a sample stage 70 and a housing 80. The sample stage 70 is used for placing the sample cup 2, the sample cup 2 being used for containing the sample fluid. The housing 80 is provided with an operation stage 83 opened towards the front side thereof, and the sample stage 70 is at least partially located in the operation stage 83 to facilitate the user to perform operations of placing the sample cup 2, taking out the sample cup 2, or the like, in the operation stage 83. A water disposal pan 88 located below the sample stage 70 may be provided in the operation stage 83 to receive a possibly dripping fluid, thereby preventing contamination of the operation stage 83. At least some sections of the microfluidic biochip 10 and the detection mechanism 20 are arranged in the housing 80.

Figure 7:
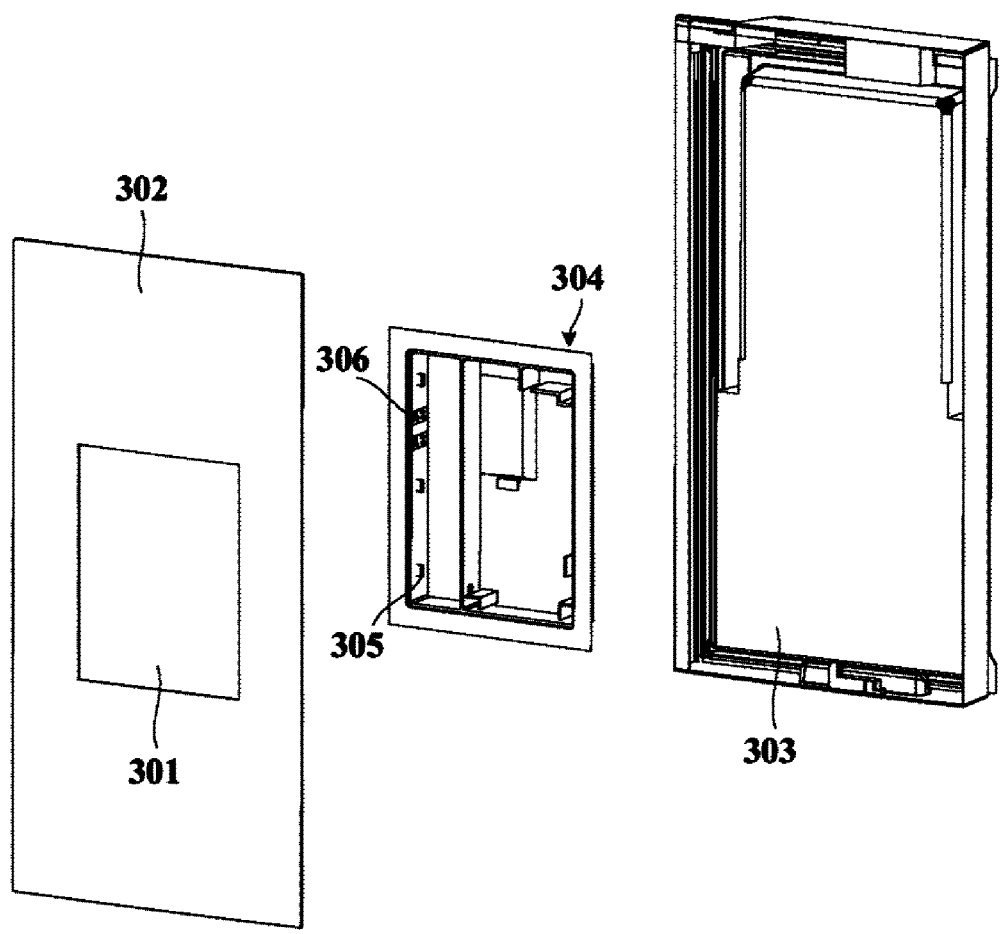
FIG. 7 is a schematic exploded structural diagram of a door in an embodiment of the present invention.

FIG. 7 is a schematic exploded structural diagram of the door in an embodiment of the present invention. Further, referring to FIGS. 1, 2 and 7, a hollowed window 301 is formed in the front side of the door 300, and the operation stage 93 is exposed on the front side of the door 300 through the hollowed window 301. That is, the operation stage 83 is exposed, such that the user can conveniently carry out a series of operations in the operation stage 93 without opening the door 300, such as taking and placing of the sample cup 2, replacement of the microfluidic biochip 10, or the like; on the one hand, the problem of serious cold leakage caused by an increase of the opening frequency of the door 300 due to the arrangement of the microfluidic detection system 1 in the refrigerator 100 can be avoided to guarantee the refrigerator 100 to have a good heat insulation performance; on the other hand, the user is not required to open the door 300 when performing the detection operation, thus improving the convenience of operation of the microfluidic detection system 1 by the user.

In some embodiments, the door 300 may include a panel 302 for forming a front portion thereof, a door liner 303 for forming a rear portion thereof, and a foamed heat insulation layer (not shown) provided between the panel 302 and the door liner 303, and the hollowed window 301 is formed in the panel 302. A pre-embedded box 304 is pre-embedded between the panel 302 and the door liner 303 before the foamed heat insulation layer is formed, and the microfluidic detection system 1 is provided in the pre-embedded box 304. That is, the pre-embedded box 304 is pre-provided between the panel 302 and the door liner 303 before the door 300 is foamed, so as to reserve a space for mounting the microfluidic detection system 1 between the panel 302 and the door liner 303.

Further, the pre-embedded box 304 is attached to a rear surface of the panel 302, the front side of the pre-embedded box 304 is open and directly faces the hollowed window 301, such that the microfluidic detection system 1 is allowed to be mounted in the pre-embedded box 304 from front to back through the hollowed window 301, thus improving the mounting convenience of the microfluidic detection system 1.

In some embodiments, the housing 80 is provided with a first structural connecting piece 81 for being connected with the pre-embedded box 304, and a first electrical connecting piece 82 for forming an electrical connection between the microfluidic detection system 1 and an electrical control device of the refrigerator 100, so as to allow the microfluidic detection system 1 to be mounted to the door 300 as a whole. The pre-embedded box 304 is provided with a second structural connecting piece 305 matched and connected with the first structural connecting piece 81 and a second electrical connecting piece 306 electrically connected with the first electrical connecting piece 82, and the second electrical connecting piece 306 is electrically connected with the electrical control device of the refrigerator 100. Thus, the microfluidic detection system 1 is mounted on the door 300 as a whole by arranging the corresponding structural connecting pieces and electrical connecting pieces on the pre-embedded box 304 and the housing 80, such that the whole microfluidic detection system 1 is connected with the refrigerator 100 in terms of both structure and circuit. Thus, an assembly process of the microfluidic detection system 1 is simplified, and the disassembly or maintenance of the microfluidic detection system 1 is facilitated.

In some embodiments, the microfluidic biochip 10 is provided above the sample stage 70, and the sample inlet 111 is located at the bottom of the microfluidic biochip 10. The sample stage 70 is configured to controllably or operably move up and down, such that the sample stage 70 is switched between a detection position allowing the sample fluid in the sample cup 2 placed on the sample stage to be in contact with the sample inlet 111 and an initial position at a preset distance below the detection position. Thus, sample loading of the microfluidic biochip 10 is realized. The user is only required to place the sample cup 2 on the sample stage 70, or after placing the sample cup 2 on the sample stage 70, the user moves the sample stage 70 to a position where the sample fluid is in contact with the sample inlet 111 of the microfluidic biochip 10, such that the sample loading operation is quite convenient, and time and labor are saved. In addition, in the present application, the sample stage 70 is configured to be movable, thus omitting complex structures, such as a sample fluid delivery pump, a delivery pipeline, a sampling needle, or the like, such that the microfluidic detection system 1 has a quite simple structure, and thus is suitable for being integrated on a refrigerator to facilitate family use. Meanwhile, the initial position is located at the preset distance below the detection position, and interference with the microfluidic biochip 10 or other structures can be avoided when the sample cup 2 is placed, thus further improving the convenience and comfort degree of operations.

Further, the microfluidic detection system 1 further includes a lifting mechanism 60 for driving the sample stage 70 to move up and down, such that the sample stage 70 is automatically switched between the detection position and the initial position. That is, the sample stage 70 may be automatically lifted and lowered by the lifting mechanism 60. During sample loading, the user is only required to place the sample cup 2 on the sample stage 70 when the sample stage 70 is located at the initial position, and the lifting mechanism 60 can automatically lift the sample stage 70 to the detection position thereof without continuous participation of the user, thus improving the automation degree of the microfluidic detection system 1. The initial position is located at the preset distance below the detection position, and the interference with the microfluidic biochip 10 or other structures can be avoided when the sample cup 2 is placed, thus further improving the convenience and comfort degree of operations.

Figure 8:
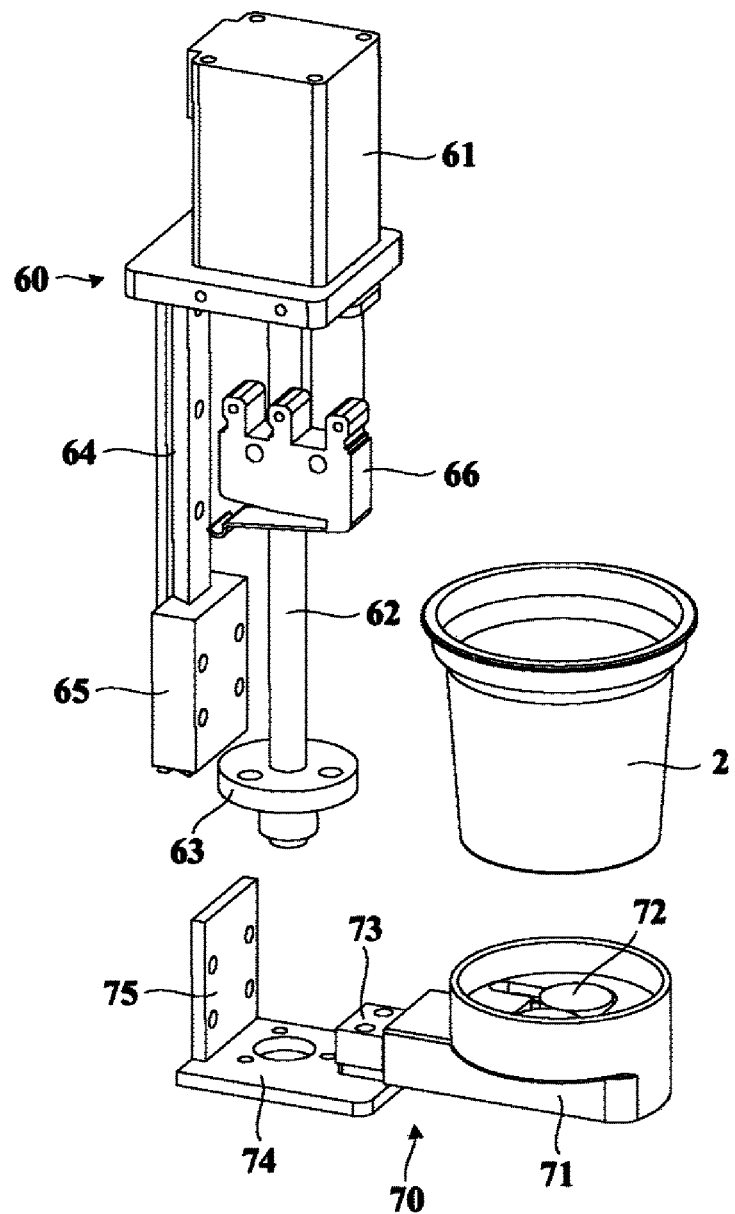
FIG. 8 is a schematic structural diagram of a lifting mechanism and a sample stage in a disassembled state in an embodiment of the present invention.

FIG. 8 is a schematic structural diagram of the lifting mechanism and the sample stage in a disassembled state in an embodiment of the present invention. In some embodiments, the lifting mechanism 60 may include a lifting motor 61, a transmission lead screw 62, and a nut 63. The lifting motor 61 is used to output a driving force. The transmission lead screw 62 is vertically provided and connected with an output shaft of the lifting motor 61 to be rotated under the driving of the lifting motor 61. The transmission lead screw 62 penetrates through the nut 63, and the nut is in threaded connection with the transmission lead screw 62 to move up and down along the transmission lead screw 62 with the rotation of the transmission lead screw 62. The sample stage 70 is fixedly connected with the nut 63 so that the nut 63 drives the sample stage 70 to move up and down.

Further, the lifting mechanism 60 further includes a slide rail 64 and a slider 65. The slide rail 64 is provided beside the transmission lead screw 62 in parallel with the transmission lead screw 62, the slider 65 is movably provided on the slide rail 64, and the sample stage 70 is fixedly connected with the slider 65; thus, the sample stage 70 is guided to move up and down through the cooperation of the slide rail 64 and the slider 65. Specifically, the slider 65 is driven to move synchronously when the sample stage 70 moves in the up-down direction under the action of a driving module, the slider 65 is limited on the slide rail 64, and the slide rail 64 has guiding and limiting effects on the movement of the slider 65, such that the sample stage 70 is indirectly guided and limited, the sample stage 70 is prevented from being shifted or jammed in a moving process, and the movement stability of the sample stage 70 is improved. Specifically, the sample stage 70 may include a horizontal connecting plate 74 through which the transmission lead screw 62 penetrates and which is fixedly connected with the nut 63, and a vertical connecting plate 75 extending upwards perpendicular to the horizontal connecting plate 74, the vertical connecting plate 75 being fixedly connected with the slider 65.

In some embodiments, the lifting mechanism 60 further includes a limit switch 66, and the limit switch 66 is provided close to an upper portion of the transmission lead screw 62 to cause the lifting motor 61 to stop operation when the sample stage 70 moves upwards to touch the limit switch 66. The position of the limit switch 66 is set such that the sample stage 70 is located at the detection position thereof when the lifting motor 61 stops operation under the trigger of the limit switch 66. The sample stage 70 may be kept at the detection position thereof when the lifting motor 61 does not operate. In the present application, the detection position of the sample stage 70 is positioned by the limit switch 66, the positioning is accurate, and the problem that the sample stage 70 exceeds the detection position thereof and continues to move to cause structural damage to the sample stage 70, the microfluidic biochip 10, or the like, can be avoided.

In some embodiments, the sample stage 70 may include a support stage 71 and an oscillator 72. The support stage 71 is used for supporting the sample cup 2. Specifically, the support stage 71 may be a horizontally placed support plate, and a groove for placing the bottom of the sample cup 2 therein may be provided on the support plate, so as to prevent the sample cup 2 from toppling or shaking during the moving process of the sample stage 70, thereby improving the stability of the placement of the sample cup 2. The support stage 71 is fixedly connected with the horizontal connecting plate 74.

The oscillator 72 is provided on the support stage 71, and is used to oscillate the sample cup 2 after the sample cup 2 is placed on the support stage 71, such that a buffer fluid and a sample in the sample cup 2 are fully mixed, thereby fully dissolving a to-be-detected substance on the sample into the buffer fluid to obtain the sample fluid with a suitable concentration.

In some embodiments, the sample stage 70 further includes a weighing sensor 73, and the weighing sensor 73 is provided below the support stage 71 for weighing the weight of the sample in the sample cup 2, thereby allowing a buffer fluid driving device 30 to deliver a preset quantity of the buffer fluid matched with the weight of the sample to the sample cup 2. In general, the sample is extracted at will by a home user, for example, a small vegetable leaf is torn off at will, and therefore, in order to guarantee the accuracy of a measurement result, the quantity of the buffer fluid input into the sample cup 2 is required to be matched with the quantity of the sample, so as to generate the sample fluid with a proper concentration. In the present application, the weight of the sample can be automatically and accurately obtained by the weighing sensor 73 provided below the support stage 71, such that the buffer fluid driving device 30 is automatically controlled to input the matched quantity of the buffer fluid into the sample cup 2, thus guaranteeing the accuracy of the measurement result, avoiding various problems of inconvenient use, a complex operation, a large error, or the like, caused by manual weighing of the sample by the user, and further improving the automation degree of the microfluidic detection system and the use experience of the user.

It should be noted that, in some alternative embodiments, the sample stage 70 may be fixed, and the microfluidic biochip 10 may be configured to be movable, which can also facilitate a sampling operation.

In some embodiments, the microfluidic biochip 10 is removably located above the sample stage 70, and the sample inlet 111 is located at the bottom of the microfluidic biochip 10. The microfluidic detection system 1 further includes a chip mounting mechanism 51 and a chip withdrawing mechanism 52. The chip mounting mechanism 51 is provided in the housing 80 and used for supporting the microfluidic biochip 10. The chip withdrawing mechanism 52 is used for operably releasing the support effect of the chip mounting mechanism 51 on the microfluidic biochip 10, so as to release the microfluidic biochip 10 to enable the microfluidic biochip 10 to fall onto the sample stage 70 under the action of the gravity thereof. When the sample cup 2 is placed on the sample stage 70, the microfluidic biochip 10 may be automatically dropped into the sample cup 2, so as to be removed with the sample cup 2 for discarding. Preferably, the chip withdrawing mechanism 52 may be exposed on the front side of the housing 80, and then exposed on the front side of the door 300 to facilitate the user to perform a chip withdrawing operation.

In some embodiments, the microfluidic detection system 1 further includes a buffer fluid bottle 36 and the buffer fluid driving device 30. The buffer fluid bottle 36 is provided in the housing 80 and is used for containing the buffer fluid. The buffer fluid driving device 30 is provided in the housing 80 and is communicated with the buffer fluid bottle 36 to controllably drive the buffer fluid in the buffer fluid bottle 36 into the sample cup 2 placed on the sample stage 70, such that the buffer fluid is mixed with the sample in the sample cup 2 to generate the sample fluid. Specifically, the buffer fluid bottle 36 is communicated with the buffer fluid driving device 30 through an inlet pipe 32. An outlet pipe 31 of the buffer fluid driving device 30 extends to the sample stage 70. This arrangement is adopted mainly for a solid sample as a detected sample, and the buffer fluid is required to dissolve the to-be-detected substance on the solid sample to form the sample fluid; or, the sample is a fluid sample, but has a too high concentration, and the sample is required to be diluted using the buffer fluid to produce the sample fluid. For example, during pesticide residue detection, the detected sample is usually a solid food residue piece, such as a skin, a leaf, or the like, the sample is required to be placed in the buffer fluid, and the pesticide residue on the sample is dissolved in the buffer fluid to form the sample fluid.

Specifically, the buffer fluid driving device 30 may be a peristaltic pump, a diaphragm pump or other suitable types of driving devices. The peristaltic or diaphragm pump generates large vibrations in the radial direction thereof when in operation, and in order to prevent the vibrations from being transmitted to the microfluidic biochip 10, an elastic damping piece 35 may be provided on the radial outer side of the peristaltic or diaphragm pump. The elastic damping piece 35 may be fitted over the buffer fluid driving device 30 and supported in the housing 80 by the clamping effect of a bracket 87 and a fixed block 89, and the fixed block 89 may be fixed on a support plate 86.

In some embodiments, the microfluidic detection system 1 further includes a sample fluid driving device 40 in sealed communication with the communication port 112 through a connecting pipeline 46 to impel the sample fluid in contact with the sample inlet 111 to flow into the microfluidic channel 14 and flow to the detection pool 121 by means of the microfluidic channel 14. Specifically, the communication port 112, the detection pool 121 and the sample inlet 111 are sequentially communicated to form the main channel, and the sample fluid driving device 40 can draw air outwards to form a negative pressure in the main channel, so as to promote the sample fluid in contact with the sample inlet 111 to enter the microfluidic channel and the detection pool 121 under the action of the negative pressure. Further, the sample fluid driving device 40 can be hermetically docked with the microfluidic biochip 10 by a sealed docking mechanism 90, thereby ensuring that the sample fluid driving device 40 is hermetically communicated with the communication port 112. Specifically, the sample fluid driving device 40 may be a micro injection pump.

In some embodiments, the microfluidic detection system 1 further includes a circuit board 53, a display device 56, and a switch button 57, and the circuit board 53 is provided within the housing 80 and electrically connected with the first electrical connecting piece 82 on the housing 80. The electrical components of the microfluidic detection system 1 are all electrically connected to the circuit board 53 directly or indirectly. The display device 56 is provided on the front side of the housing 80 and electrically connected to the circuit board 53 for displaying a detection result of the detection mechanism 20. The switch button 57 is provided on the front side of the housing 80 and electrically connected to the circuit board 53 for activating and/or deactivating a detection function of the microfluidic detection system 1. That is, the user can start, pause, or stop the detection function of the microfluidic detection system 1 by operating the switch button 57.

In some embodiments, the housing 80 includes a rear shell 84 at the rear side and a front panel 85 connected to the front side of the rear shell 84. An accommodating cavity is defined between the rear shell 84 and the front panel 85 after the rear shell and the front panel are assembled. The support plate 86 and the bracket 87 are further provided in the accommodating cavity of the housing 80. The support plate 86 is fixedly connected to the rear shell 84, and at least a part of the structure of the lifting mechanism 60 (for example, the non-movable part of the lifting mechanism 60) and the buffer fluid driving device 30 are fixed on the support plate 86. The bracket 87 is fixedly connected to the front side of the support plate 86, and the microfluidic biochip 10 and the sample fluid driving device 40 are directly or indirectly supported on the bracket 87. Thus, the lifting mechanism 60, the buffer fluid driving device 30, the microfluidic biochip 10, and the sample fluid driving device 40 can be stably supported by the support plate 86 and the bracket 87 in the accommodating cavity formed between the rear shell 84 and the front panel 85.

In some embodiments, the lifting mechanism 60 may be provided on the transverse side of the sample stage 70, the buffer fluid driving device 30 may be provided on one side of the microfluidic biochip 10 in the transverse direction and located above the lifting mechanism 60, the sample fluid driving device 40 is located on the other side of the microfluidic biochip 10 in the transverse direction, and the buffer fluid bottle 36 is located on a side of the sample fluid driving device 40 away from the microfluidic biochip 10. For the microfluidic biochip 10, the sample stage 70, the lifting mechanism 60, the buffer fluid driving device 30, the sample fluid driving device 40 and the buffer fluid bottle 36 with such a layout, the size features of each module in the vertical direction and the transverse direction are fully utilized, such that the layout of the modules is more compact, and the occupied space is reduced as far as possible. Moreover, the modules are only arranged side by side in the vertical direction and the transverse direction, such that the thickness of the microfluidic detection system 1 in the front and rear direction is reduced as far as possible, and therefore, after the microfluidic detection system 1 is integrated on the door 300, the thickness of the door 300 is not increased, and the thickness of the heat insulation layer of the door 300 is not reduced greatly.

A partition 861 extending transversely may be provided between the buffer fluid driving device 30 and the lifting mechanism 60 to avoid that a leaked fluid possibly generated by the buffer fluid driving device 30 drops on the lifting mechanism 60 to affect the normal operation of the lifting mechanism 60. The partition 861 may be fixed on the support plate 86.

The refrigerator 100 according to the present application is a refrigerator in a broad sense, and includes not only a so-called refrigerator in a narrow sense, but also a storage device having a refrigerating, freezing or other storage function, for example, a refrigerating box, a freezer, or the like.

It should also be understood by those skilled in the art that the terms "up", "down", "front", "rear", "top", "bottom", or the like, used in the embodiments of the present invention are used as terms for indicating the orientation or the positional relationship with respect to the actual use state of the refrigerator 100, and these terms are only used for convenience of description and understanding of the technical solution of the present invention, and do not indicate or imply that the device or the component referred to must have a specific orientation, or be configured and operated in a specific orientation, and therefore, should not be construed as limiting the present invention.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A refrigerator, comprising:
   a refrigerator body internally defining a storage space for storing articles;
   a door connected to the refrigerator body and used for opening and/or closing the storage space; and
   a microfluidic detection system which is provided on the door and comprises:
   a microfluidic biochip having a sample inlet, a communication port, and a detection pool formed in the microfluidic biochip, the sample inlet, the detection pool, and the communication to port being communicated in sequence by means of a microfluidic channel to allow a sample fluid in contact with the sample inlet to enter the microfluidic channel and flow into the detection pool by means of the microfluidic channel; and
   a detection mechanism used for detecting the detection pool to obtain a preset detection parameter of the sample fluid.

2. The refrigerator according to claim 1, wherein the microfluidic detection system further comprises:
   a sample stage for placing a sample cup, the sample cup being used for containing the sample fluid; and
   a housing provided with an operation stage opened towards the front side thereof, the sample stage being at least partially located in the operation stage.

3. The refrigerator according to claim 2,
wherein a hollowed window is formed in the front side of the door, and the operation stage is exposed on the front side of the door through the hollowed window.

4. The refrigerator according to claim 3,
wherein the door comprises a panel for forming a front portion of the door, a door liner for forming a rear portion of the door and a foamed heat insulation layer provided between the panel and the door liner, and the hollowed window is formed on the panel; and
a pre-embedded box is pre-embedded between the panel and the door liner before the foamed heat insulation layer is formed, and the microfluidic detection system is provided in the pre-embedded box.

5. The refrigerator according to claim 4,
wherein the pre-embedded box is attached to a rear surface of the panel, and the front side of the pre-embedded box is open and directly faces the hollowed window to allow the microfluidic detection system to be mounted into the pre-embedded box from front to back through the hollowed window.

6. The refrigerator according to claim 5,
wherein the housing is provided with a first structural connecting piece for being connected with the pre-embedded box and a first electrical connecting piece for forming an electrical connection between the microfluidic detection system and an electrical control device of the refrigerator, so as to allow the microfluidic detection system to be mounted to the door as a whole;
the pre-embedded box is provided with a second structural connecting piece matched and connected with the first structural connecting piece and a second electrical connecting piece electrically connected with the first electrical connecting piece, and the second electrical connecting piece is electrically connected with the electrical control device.

7. The refrigerator according to claim 2,
wherein the microfluidic biochip is provided above the sample stage, and the sample inlet is located at the bottom of the microfluidic biochip; and
the sample stage is configured to controllably or operably move up and down, such that the sample stage is switched between a detection position allowing the sample fluid in the sample cup placed on the sample stage to be in contact with the sample inlet and an initial position at a preset distance below the detection position.

8. The refrigerator according to claim 2,
wherein the microfluidic biochip is removably located above the sample stage, and the sample inlet is located at the bottom of the microfluidic biochip; and
the microfluidic detection system further comprises:
a chip mounting mechanism provided in the housing and used for supporting the microfluidic biochip; and
a chip withdrawing mechanism used for operably releasing the support effect of the chip mounting mechanism on the microfluidic biochip, so as to release the microfluidic biochip to enable the microfluidic biochip to fall onto the sample stage under the action of the gravity thereof.

9. The refrigerator according to claim 2, wherein the microfluidic detection system further comprises:
a buffer fluid bottle provided in the housing and used for containing a buffer fluid; and
a buffer fluid driving device provided in the housing and communicated with the buffer fluid bottle to controllably drive the buffer fluid in the buffer fluid bottle into the sample cup placed on the sample stage, such that the buffer fluid is mixed with a sample in the sample cup to generate the sample fluid.

10. The refrigerator according to claim 9, wherein the sample stage comprises:
a support stage used for supporting the sample cup; and
an oscillator provided on the support stage and used for oscillating the sample cup after the sample cup is placed on the support stage, such that the buffer fluid and the sample in the sample cup are fully mixed.

11. The refrigerator according to claim 1, wherein the microfluidic detection system further comprises:
a sample fluid driving device in sealed communication with the communication port to impel the sample fluid in contact with the sample inlet to flow into the microfluidic channel and flow to the detection pool by means of the microfluidic channel.

* * * * *

UNITED STATES PATENT AND TRADEMARK OFFICE
CERTIFICATE OF CORRECTION

PATENT NO. : 11,813,611 B2
APPLICATION NO. : 18/246465
DATED : November 14, 2023
INVENTOR(S) : Haoquan Liu et al.

It is certified that error appears in the above-identified patent and that said Letters Patent is hereby corrected as shown below:

In the Claims

In Column 12, Line 52, Claim 1, delete "communication to port" and insert -- communication port --, therefor.

Signed and Sealed this
Thirteenth Day of February, 2024

Katherine Kelly Vidal
*Director of the United States Patent and Trademark Office*